May 27, 1958  D. G. GRISWOLD  2,836,207
AVIATION FUELING HYDRANT VALVE
Filed June 13, 1955  2 Sheets-Sheet 2
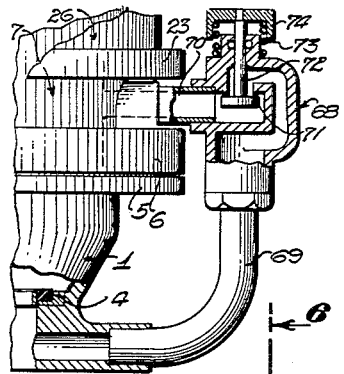
FIG. 8
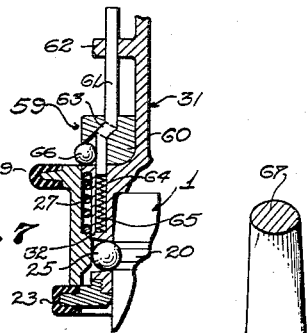
FIG. 7
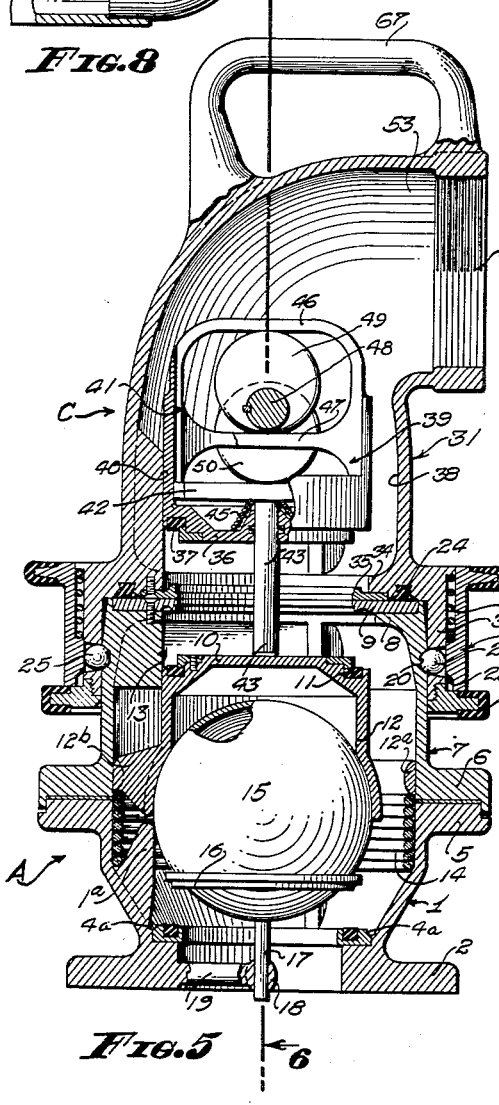
FIG. 5
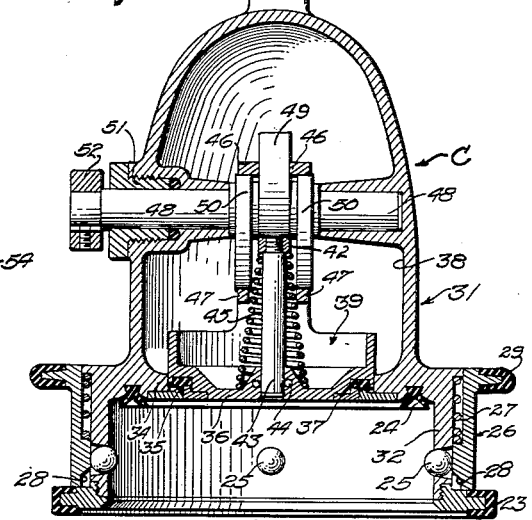
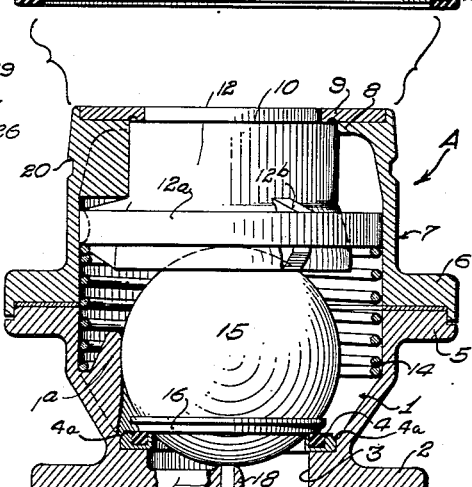
FIG. 6
INVENTOR.
DONALD G. GRISWOLD
BY
ATTORNEYS United States Patent Office 2,836,207
Patented May 27, 1958

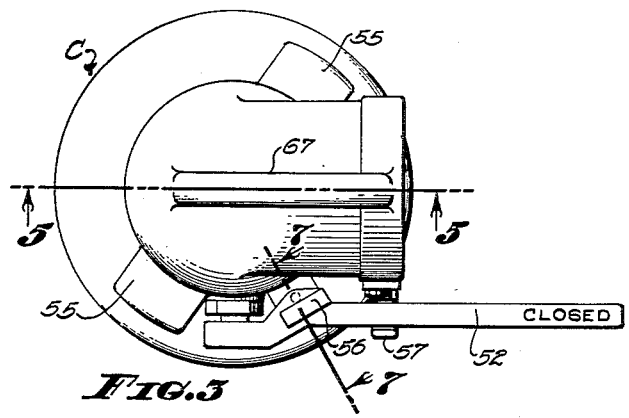

2,836,207

AVIATION FUELING HYDRANT VALVE

Donald G. Griswold, San Marino, Calif.

Application June 13, 1955, Serial No. 514,932

15 Claims. (Cl. 141—346)

My invention relates to aviation fueling hydrant valves. In order to effect quick and safe refueling and defueling of aircraft at landing fields, an elaborate buried network of piping, storage facilities, contamination-removing means, and control valves are provided. Independent refueling lines and defueling lines are provided. These share common terminals located subsurface at various fueling stations on the landing field.

My aviation fueling hydrant valve comprises two cooperating valve structures, one of which is a fixed valve structure permanently attached to the fuel terminals and is disposed so as to be flush with or below the ground surface. The other or detachable valve structure is adapted to be temporarily connected during refueling or defueling operations.

Included in the objects of my invention are:

First, to provide a valve of this class which incorporates a dual shut-off valve having confronting valve elements in both the fixed and detachable valve structures, simultaneously movable between their open and closed positions by a single valve handle carried by the detachable valve structure.

Second, to provide a valve of this class wherein the fixed and detachable valve structures are connected by a quick release coupling, and means are provided to permit release only when the valve elements are in their closed positions.

Third, to provide a valve of this class which incorporates a novel float valve located in the fixed valve structure and so arranged as to be uninfluenced by flow of liquid fuel in either direction, but arranged to close off the fixed valve in the event of air or gas entering from the fuel line connected with the detachable valve, thereby to prevent entrance of air or gas into the piping system connected with the fixed valve.

Fourth, to provide a valve of this class which may incorporate a manually operable relief valve bypassing the float valve in the fixed valve structure to equalize the pressure across the float valve, to initiate defueling in the event vacuum pressure exists below the float valve or a head of liquid is applied to the upper side of the float valve; thus eliminating the need of operating the fueling pumps provided in the fuel supply system to lift the float valve.

With the above and other objects in view, as may appear hereinafter, reference is directed to the accompanying drawings in which:

Figure 1 is a top view of the fixed valve structure, forming a part of my aviation fuel hydrant valve, with the dust cap shown fragmentarily thereon;

Fig. 2 is a side view of the fixed valve structure and dust cap, shown connected to a fuel pipe, and indicating fragmentarily the manner in which it is mounted below the surface of an aircraft landing field, the dust cap being shown partially in section;

Fig. 3 is a top view of the detachable valve structure, forming a part of the aviation fueling hydrant valve;

Fig. 4 is a side view of the aviation fueling hydrant valve with the fixed and detachable valve structures shown attached;

Fig. 5 is an enlarged transverse sectional view through 5—5 of Fig. 3, showing the fixed and detachable valve structures in their open position;

Fig. 6 is a sectional view through 6—6 of Fig. 5 with the fixed and detachable valves separated and in their closed position;

Fig. 7 is a fragmentary sectional view through 7—7 of Fig. 3, showing the locking means; and Fig. 8 is a fragmentary view of the fixed valve structure, illustrating, partly in section and partly in elevation, a valve for bypassing the float valve.

My aviation fueling hydrant valve comprises, principally, a fixed valve structure A, a dust cap B, and a detachable valve structure C.

The fixed valve structure A includes a bowl 1 having a flange 2 at its lower end for attachment to the correspondingly flanged end of a fuel pipe P, terminating in the bottom of a recess R formed in an aircraft landing field. Internally the lower end of the bowl 1 is provided with a port 3 communicating with the interior of the fuel pipe P. The port 3 is bordered by an upwardly facing float valve seat ring or seal 4.

The upper end of the bowl 1 is provided with an upper flange 5 which mates with an external flange 6 of a substantially cylindrical housing 7. The upper end of the housing 7 is provided with an inturned flange 8 in which is fitted a valve seat and seal wear ring 9 forming a port.

Mounted within the housing 7 is a valve disc 10 having an annular yieldable valve seal 11 which engages the under side of the valve seat ring 9 to seal the upper end of the housing 7. When in its sealing position, the upper surface of the valve disc 10 is substantially flush with the upper surface of the housing 7.

The under side of the valve disc 10 is provided with a depending skirt or shell 12 defining a zone of a sphere at its lower extremity disposed with its open end facing downward. The valve disc 10 and upper portion of the shell 12 are guided vertically in the housing 7 by means of guide ribs 13 extending radially inward from the side walls of the housing. The lower portion of the shell is surrounded by a guide ring 12a spaced from the shell by radiating webs 12b. The ring 12a rides within the cylindrical lower portion of the housing 7. A spring 14 engages the under side of the guide ring 12a. The lower extremity of the spring 14 rests on shoulders formed by guide fins 1a within the bowl 1.

Mounted within the bowl 1 and housing 7 and guided by the fins 1a is a float ball 15 having a seat ring 16 adapted to engage the valve seat 4. The float ball is provided with a depending guide stem 17 which rides in a guide 18 centered in the bore 3 by radiating arms 19.

The housing 7 is provided in its outer surface with an annular latching groove 20, and the external surface of the housing 7, above the latching groove 20, is slightly tapered, inwardly.

The upper portion of the housing 7 is adapted to be covered by the dust cap B, which includes a cap member 21 adapted to overlie the upper surface of the housing 7. The cap is provided with a skirt 22 which extends over the outside of the housing 7 to a point below the latching groove 20. The lower extremity of the skirt 22 is provided with a bumper and guard ring 23. The under surface of the cap member 21, confronting the outer marginal portion of the valve seat and seal wear ring 9, set in the upper surface of the housing 7, is provided with an undercut annular groove in which is fitted a yieldable seal ring 24 having downwardly diverging lips which sealingly engage the wear ring 9.

The skirt 22 is provided with a series of radial openings which are adapted to receive the latch balls 25 engageable with the latching groove 20. The latch balls 25 are held in their radially inner or latching position by means of a latch sleeve 26 which surrounds the skirt 22 and is capable of relative axial movement. The latch sleeve is held in its axially lower position by means of a spring 27 interposed between the skirt 22 and the sleeve 26.

The lower extremity of the latch sleeve 26 is provided with a radially outwardly offset shoulder 28 so proportioned that when the latch sleeve is raised relative to the skirt 22 the latch balls 25 are capable of limited radially outward movement so as to disengage the latching groove 20.

The upper extremity of the latch sleeve 26 is provided with an annular finger rim 29 which underlies and is capable of moving into a channeled drip flange 30 surrounding the cap member 21. By engaging the finger rim 29 the latch sleeve 26 may be raised so as to permit insertion or removal of the dust cap B.

The detachable valve structure C is interchangeable with the dust cap B.

The detachable valve structure C includes a valve body 31 having a skirt 32 adapted to surround the upper portion of the housing 7 in the same manner as the skirt 22 of the dust cap B. Also, similar to the dust cap, the skirt 32 is provided with apertures which receive latch balls 25 and is surrounded by a latch sleeve 26. Similarly, the spring 27, offset shoulder 28, finger rim 29, and bumper and guard ring 23 are identical to the corresponding parts of the dust cap. Also the valve body 31 overlies the upper surface of the housing 7 and is provided with a seal ring 24 identical to the seal ring 24 in the dust cap B.

The portion of the valve body 31 overlying the housing 7 forms an internal flange 34 having a central opening in which is fitted a valve seat ring 35 which overlies the radially inner margin of the valve seat ring 9 of the fixed valve structure A, as shown best in Fig. 5.

Mounted within the valve body 31 is a valve disc 36 having a yieldable annular valve seal 37 adapted to engage the valve seat ring 35. The valve disc 36 is adapted to close the opening through the valve seat ring 35, and when the detachable valve structure C is secured to the fixed valve structure A the valve disc 36 confronts the valve disc 10 when the valve discs are in their closed position.

The valve body 31 includes a tubular portion 38 extending upwardly from the housing 7 in concentric relation therewith. The valve disc 36 forms the lower end of a cage 39 which extends upwardly into the tubular portion 38 of the valve body, and is guided by suitable guide ribs 40 extending radially inward from the side walls of the tubular portion 38. The cage 39 is provided with diametrically opposed channels or grooves 41.

A cross bar 42 extends between the grooves 41 and is attached to a stem 43 which extends downwardly through the valve disc 36. A seal ring 44 surrounds the stem 43, and a spring 45 interposed between the valve disc 36 and the cross bar 42 tends to hold the stem and cross bar in their raised position relative to the valve disc. On opposite sides of the path of the cross bar 42 are upper and lower webs 46 and 47 which are parallel to the cross bar.

A shaft 48 is journaled transversely in the tubular portion 38 of the valve body 41. The shaft extends through the cage 39, between the webs 46 and 47, and above the cross bar 42. Mounted on the shaft 48 is an eccentric 49 which engages the cross bar 42. Flanking the eccentric 49 is a pair of eccentrics 50 which are 180° displaced and arranged to engage the webs 46 and 47.

The arrangement of the eccentrics 49 and 50 is such that on rotation of the shaft 48 the eccentric 49 forces the stem 43 downward while the eccentric 50 raises the cage 39 and valve disc 36. The lower end of the stem 43 bears against the valve disc 10 so that on being forced downward the stem 43 forces the valve disc 10 to its open position, as shown in Fig. 5.

The shaft 48 protrudes from one side of the tubular portion 38 of the valve body 31 through a suitable packing gland 51. The protruding end of the shaft 48 is provided with a hand lever 52.

The upper end of the tubular portion 38 of the valve body 31 curves to form an elbow 53 terminating in a laterally directed port 54. The port 54 is internally screw threaded, or otherwise arranged, to permit attachment to a hose or fuel line H, as indicated in Fig. 4.

At the outer side of the tubular portion 38 there is provided a protruding shelf or stop 55 which is engaged by a boss 56 formed on the hand lever 52. When the boss 56 engages the stop 55, as indicated by broken lines in Fig. 4, the hydrant valve is in its open position.

Secured to the side of the elbow 53 is a stirrup 57 which receives the hand lever 52 when it is moved to its position closing the hydrant valve. The movement of the hand lever 52 is slightly more than 180° so that when the hand lever is moved to its extreme open position the eccentrics are slightly past center, in order that the forces exerted by the flow of liquid through the hydrant valve will not tend to close the valve discs 10 and 36.

In order to limit upward movement of the latch sleeve 26, the tubular portion 38 of the valve body 31 is provided with external ribs having stop shoulders 58.

It is desirable that the detachable valve structure C be locked on the fixed valve structure A when the hydrant valve is in operation. This is accomplished by means of a lock 59 mounted at the side of the tubular portion 38 of the valve body 31. The lock includes a block 60 having a vertically reciprocable lock pin 61, the upper end of which extends through a guide lug 62 on the side of the valve body and positioned so that the upper end of the lock pin 61 is engaged by the hand lever 52 when the hand lever is in its closed position, shown in Fig. 4.

The lock pin 61 is provided with an offset portion 63, and its lower end extends downwardly into a recess 64 provided in the skirt 32 of the valve body 31, as shown in Fig. 7. A spring 65 urges the lock pin 61 toward its upper position.

The block 60 is provided with a lateral aperture adapted to receive a key ball 66 which, when extended, partially overlies the upper end of the sleeve 26, as shown in Fig. 7. The offset 63 is so located that when the lock pin 61 is depressed by the hand lever 52 the key ball 66 may move radially inward to permit upward movement of the sleeve 26 and release of the latch ball 25.

To facilitate carrying the detachable valve structure C, the upper side of the elbow 53 may be provided with a carrying handle 67.

Reference is now directed to Fig. 8, which illustrates a by-pass around the float valve. This is desirable in some installations for defueling operations. If a vacuum should exist in the defueling system beyond the float valve, or if a head of fuel should exist in the defueling line leading from the aircraft fuel tanks, the defueling cannot be accomplished without first relieving the pressure differential across the float valve. This may be accomplished by momentary operation of the fueling pumps connected with the fuel supply system; however, this may be undesirable. The by-pass accomplishes the same result.

The by-pass comprises a valve body 68, located at one side of the fixed valve structure, having an outlet connected through a tube 69 to a point below the float valve and an inlet connected through a tube 70 to a point above the float valve. A valve element 71 attached to a stem 72 is held in a normally closed position by a spring 73. A head 74 is provided on the stem 72 which may be stepped on or otherwise forced downwardly to open the by-pass valve and equalize the pressure around the float valve.

Operation of my aviation fueling hydrant valve is as follows:

When the fixed and detachable valve structures A and C are separated, the valve discs 10 and 36 are in their closed position, shown in Fig. 6, so that both the fuel pipe line P and hose or fuel line H are sealed. The dust cap B is removed by drawing upwardly on the sleeve 26 to release the latch balls 25. The detachable valve structure C is substituted by first raising its latch sleeve 26 to release the latch balls 25, and then forcing the lower end of the valve body 31 over the housing 7.

After removal of the dust cap B and mounting of the detachable valve structure C, the hand lever 52 may be moved to its open position, causing the eccentrics 49 and 50 to spread the valve discs 10 and 36 apart so as to provide an open passage between the fuel pipe P and the hose H.

As long as the hydrant valve is filled with liquid to a point above the float ball 15, liquid fuel may flow in either direction through the hydrant valve. Such flow has little or no effect on the float ball 15, for the buoyancy of the float ball maintains it within the hemispherical shell 12, as shown in Fig. 5. Should the liquid level in the hydrant valve drop, the float valve likewise drops and engages the float valve seat 4, closing the port 3.

Thus in the operation of fueling an aircraft, the liquid fuel flows upwardly through the hydrant valve. Should the fuel hose break, or for any other reason should air or gas enter the hydrant valve, the float valve closes to prevent the air or gas from entering the fuel supply pipe. Similarly, in the operation of defueling an aircraft, as soon as the liquid fuel has been depleted the float valve automatically closes to prevent entrance of air or gas into the defueling line connecting with the pipe P.

After the refueling or defueling operation, the detachable valve structure C is quickly removed by drawing upwardly on the sleeve 26 to release the latch ball 25, first, however, moving the hand lever 52 to the position closing the valve discs 10 and 36, and permitting the lock 59 to release the sleeve 26.

In the event a pressure differential exists across the float valve, preventing initiation of the defueling operation, the head 74 of the by-pass valve may be depressed to open the by-pass valve until the pressure is equalized, so that the defueling operation may proceed.

It should be observed that when the valve is in its open position, shown in Fig. 5, the float ball 15 is quite well shielded by the shell 12 so that it tends to remain therein and clear of the seat 4, irrespective of the direction of flow of the liquid. However, the force holding the ball valve in the shell may be increased by forming an annular deflecting channel 4a radially outward from the valve seal 4, as shown best in Figs. 5 and 6. The channel deflects the downwardly flowing liquid upwardly against the underside of the ball, after which the liquid again rebounds and discharges through the port 3.

Having fully described my invention, it is to be understood that I do not wish to be limited to the details herein set forth, but my invention is of the full scope of the appended claims.

I claim:

1. An aviation fueling hydrant valve, comprising: a fixed valve body adapted for attachment at its lower end to a fuel pipe and having a centrally ported flat upper surface; a detachable valve body adapted for attachment at its upper end to a fuel line and arranged to fit on the upper end of said fixed valve body, said detachable valve body having a ported flat surface contiguous to and confronting the ported flat upper surface of said fixed valve body; seal means between said surfaces; coaxial valve seats bordering said ports and facing downward and upward into said fixed and detachable valve bodies, respectively; a first valve element in said fixed valve body upwardly movable to engage the downwardly facing valve seat; a second valve element in said detachable valve body downwardly movable to engage the upwardly facing valve seat, said valve elements being in contiguous relation when closed; a rotatable shaft traversing said detachable valve body; opposed cams mounted on said shaft; a first cam follower means engageable by one of said cams and including a stem extending through said second valve element to engage the first valve element; and a second cam follower means engageable with the opposed cam and connected with said second valve element; said cams and cam followers operable on rotation of said shaft to separate said valve elements, thereby to open communication between said fuel pipe and fuel hose.

2. An aviation fueling and defueling hydrant valve, comprising: a fixed valve structure adapted for attachment to a pipe line; a detachable valve structure adapted for connection to a fueling and defueling hose; a separable coupling for joining the ends of said valve structures remote from the pipe line and hose, respectively, in end-to-end relationship; confronting valve elements at the joined ends of said valve structures; means in said detachable valve structure operatively engageable with both of said valve elements to effect simultaneous opening of said valve elements to permit flow between said pipe line and said fueling hose; a float valve in said fixed valve structure adapted, on depletion of liquid in said fixed valve structure, to close said fixed valve structure against the flow of gaseous fluid into said pipe line; and means shielding said float valve from the force incidental to back flow of liquid fuel from said hose to said pipe line through said fixed valve structure, whereby the buoyancy of said float valve remains effective to maintain said float valve open until the liquid fuel is depleted in said fixed valve structure.

3. An aviation fueling and defueling hydrant valve, comprising: a fixed valve structure adapted for attachment to a pipe line; a detachable valve structure adapted for connection to a fueling and defueling hose; a separable coupling for joining the ends of said valve structures remote from said pipe line and hose, respectively, in end-to-end relationship; confronting valve elements at the joined ends of said valve structure; a valve element thrust means and a valve element retraction means in said detachable valve structure engageable, when said valve structures are joined, with the valve elements of said fixed valve structure and detachable valve structure, respectively, to open said valve elements; a float valve in said fixed valve structure adapted, on depletion of liquid in said fixed valve structure, to close said fixed valve structure against the flow of gaseous fluid into said pipe line; and means shielding said float valve from the forces incidental to back flow of liquid fuel from said hose to said pipe line through said fixed valve structure, whereby the buoyancy of said float valve remains effective to maintain said float valve open until the liquid fuel is depleted in said fixed valve structure.

4. An aviation fueling and defueling hydrant valve, comprising: a fixed valve structure adapted for attachment to a pipe line; a detachable valve structure adapted for connection to a fueling and defueling hose; a separable coupling for joining the ends of said valve structures remote from said pipe line and hose, respectively, in end-to-end relationship; confronting valve elements at the joined ends of said valve structures; a valve element thrust means and a valve element retraction means in said detachable valve structure; an operating device common to said means disposed externally of said detachable valve structure adapted, when said valve structures are joined, to effect simultaneous opening of said valve elements; a float valve in said fixed valve structure adapted, on depletion of liquid in said fixed valve structure, to close said fixed valve structure against the flow of gaseous fluid into said pipe line; and means shielding said float valve from the forces incidental to back flow of liquid fuel from said hose to said pipe line through said fixed valve structure, whereby the buoyancy of said float valve remains effective to maintain said float valve open until the liquid fuel is depleted in said fixed valve structure.

5. An aviation fueling and defueling hydrant valve, comprising: a fixed valve body adapted for attachment at its lower end to a fuel pipe and having a centrally ported flat upper surface; a detachable valve body adapted for attachment at its upper end to a fuel line and arranged to fit on the upper end of said fixed valve body, said detachable valve body having a ported flat surface contiguous to and confronting the ported flat upper surface of said fixed valve body; seal means between said surfaces; coaxial valve seats bordering said ports and facing downward and upward into said fixed and detachable valve bodies, respectively; a first valve element in said fixed valve body upwardly movable to engage the downwardly facing valve seat; a second valve element in said detachable valve body downwardly movable to engage the upwardly facing valve seat, said valve elements being in contiguous relation when closed; a rotatable shaft traversing said detachable valve body; opposed cams mounted on said shaft; a first cam follower means engageable by one of said cams and including a stem extending through said second valve element to engage the first valve element; and a second cam follower means engageable with the opposed cam and connected with said second valve element; said cams and cam followers operable on rotation of said shaft to separate said valve elements, thereby to open communication between said fuel pipe and fuel hose; a float valve in said fixed valve body below said first valve element and a float valve seat at the lower end of said fixed valve body, said float valve adapted to engage said float valve seat on depletion of liquid in said fixed valve body to close against flow of gaseous fluid into said pipe line; and means shielding said float valve from the forces incidental to back flow of liquid fuel from said hose to said pipe line through said fixed valve body, whereby the buoyancy of said float valve remains effective to maintain said float valve open until the liquid fuel is depleted in said fixed valve body.

6. An aviation fueling and defueling hydrant valve, comprising: a valve body structure adapted for connection between a fuel pipe and a fuel hose; a valve device in said body structure adapted when open to permit flow of liquid in either direction between said fuel pipe and fuel hose; a float valve means disposed between said valve device and said fuel pipe, and a seat engageable thereby to prevent back flow of gaseous fluid into said fuel pipe; and means shielding said float valve means from the forces incidental to back flow of liquid fuel from said fuel hose and fuel pipe through said valve body structure, whereby the buoyancy of said float valve means remains effective to maintain said float valve means clear of its seat until the liquid fuel is depleted in said valve body structure.

7. An aviation fueling hydrant valve, comprising: a fixed valve body adapted for attachment at its lower end to a fuel pipe and having a centrally ported flat upper surface; a detachable valve body adapted for attachment at its upper end to a fuel line and arranged to fit on the upper end of said fixed valve body, said detachable valve body having a ported flat surface contiguous to and confronting the ported flat upper surface of said fixed valve body; seal means between said surfaces; coaxial valve seats bordering said ports and facing downward and upward into said fixed and detachable valve bodies, respectively; a first valve element in said fixed valve body upwardly movable to engage the downwardly facing valve seat; a second valve element in said detachable valve body downwardly movable to engage the upwardly facing valve seat; said valve elements being in contiguous relation when closed; a rotatable shaft traversing said detachable valve body; opposed cams mounted on said shaft; a first cam follower means engageable by one of said cams and including a stem extending through said second valve element to engage the first valve element; and a second cam follower means engageable with the opposed cam and connected with said second valve element; said cams and cam followers operable on rotation of said shaft to separate said valve elements, thereby to open communication between said fuel pipe and fuel hose; a separable coupling incorporating axially overlapping portions of said valve bodies; key elements and key-receiving means in said overlapping portions; and operating means movable between a position securing said key elements in said receiving means to connect said valve bodies, and a position releasing said key elements to permit separation of said valve bodies.

8. An aviation fueling hydrant valve, comprising: a fixed valve body adapted for attachment at its lower end to a fuel pipe and having a centrally ported flat upper surface; a detachable valve body adapted for attachment at its upper end to a fuel line and arranged to fit on the upper end of said fixed valve body, said detachable valve body having a ported flat surface contiguous to and confronting the ported flat upper surface of said fixed valve body; seal means between said surfaces; coaxial valve seats bordering said ports and facing downward and upward into said fixed and detachable valve bodies, respectively; a first valve element in said fixed valve body upwardly movable to engage the downwardly facing valve seat; a second valve element in said detachable valve body downwardly movable to engage the upwardly facing valve seat, said valve elements being in contiguous relation when closed; a rotatable shaft traversing said detachable valve body; opposed cams mounted on said shaft; a first cam follower means engageable by one of said cams and including a stem extending through said second valve element to engage the first valve element; and a second cam follower means engageable with the opposed cam and connected with said second valve element; said cams and cam followers operable on rotation of said shaft to separate said valve elements, thereby to open communication between said fuel pipe and fuel hose; a separable coupling incorporating axially overlapping portions of said valve bodies; key elements and key-receiving means in said overlapping portions; operating means movable between a position securing said key elements in said receiving means to connect said valve bodies, and a position releasing said key elements to permit separation of said valve bodies; a handle attached to said valve-element-operating shaft externally of said detachable valve body; and a locking means engageable by said handle and operative when said valve elements are open to prevent release of said key elements thereby to prevent disconnection of said valve bodies.

9. An aviation fueling and defueling hydrant valve, comprising: a valve body structure adapted for connection between a fuel pipe and a fuel hose; a valve device in said body structure adapted when open to permit flow of liquid in either direction between said fuel pipe and fuel hose; a float valve means disposed between said valve device and said fuel pipe, and a seat engageable thereby to prevent back flow of gaseous fluid into said fuel pipe; means shielding said float valve means from the forces incidental to back flow of liquid fuel from said fuel hose and fuel pipe through said valve body structure whereby the buoyancy of said float valve means remains effective to maintain said float valve means clear of its seat until the liquid fuel is depleted in said valve body structure; and a normally closed relief valve by-passing the float valve and operable to equalize pressure across said float valve.

10. An aviation fueling and defueling hydrant valve;

comprising: a fixed valve body adapted for attachment at its lower end to a fuel pipe and having a centrally ported flat upper surface; a detachable valve body adapted for attachment at its upper end to a fuel line and arranged to fit on the upper end of said fixed valve body, said detachable valve body having a ported flat surface contiguous to and confronting the ported flat upper surface of said fixed valve body; seal means between said surfaces; coaxial valve seats bordering said ports and facing downward and upward into said fixed and detachable valve bodies, respectively; a first valve element in said fixed valve body upwardly movable to engage the downwardly facing valve seat; a second valve element in said detachable valve body downwardly movable to engage the upwardly facing valve seat, said valve elements being in contiguous relation when closed; a rotatable shaft traversing said detachable valve body; opposed cams mounted on said shaft; a first cam follower means engageable by one of said cams and including a stem extending through said second valve element to engage the first valve element; and a second cam follower means engageable with the opposed cam and connected with said second valve element; said cams and cam followers operable on rotation of said shaft to separate said valve elements, thereby to open communication between said fuel pipe and fuel hose; a float valve in said fixed valve body below said first valve element and a float valve seat at the lower end of said fixed valve body, said float valve adapted to engage said float valve seat on depletion of liquid in said fixed valve body to close against flow of gaseous fluid into said pipe line; means shielding said float valve from the forces incidental to back flow of liquid fuel from said hose to said pipe line through said fixed valve body, whereby the buoyancy of said float valve remains effective to maintain said float valve open until the liquid fuel is depleted in said fixed valve body; and a normally closed relief valve by-passing the float valve and operable to equalize pressure across said float valve.

11. An aviation fueling and defueling hydrant valve, comprising: a fixed valve structure adapted for attachment to a pipe line; a detachable valve structure adapted for connection to a fueling hose; a separable coupling for joining the ends of said valve structures remote from said pipe line and hose, respectively, in end-to-end relationship; confronting valve elements at the joined ends of said valve structures; means in said detachable valve structure operatively engageable with both of said valve elements to effect simultaneous opening of said valve elements to permit flow between said pipe line and said fueling hose; a float valve in said fixed valve structure adapted, on depletion of liquid in said fixed valve structure, to close said fixed valve structure against the flow of gaseous fluid into said pipe line; and a deflecting channel formed in the lower portion of said fixed valve structure arranged to deflect liquid against the underside of said float valve, thereby to aid in retaining said float valve in its open position during down-flow of liquid through said fixed valve structure.

12. An aviation fueling hydrant valve, comprising: a fixed valve structure adapted for attachment to a pipe line; a detachable valve structure adapted for connection to a fueling hose; a separable coupling for joining the ends of said valve structures remote from said pipe line and fueling hose, respectively, in end-to-end relationship; confronting valve elements at the joined ends of said valve structures; a transverse rotatable shaft in said detachable valve structure; opposed cams mounted on said shaft and an external handle for said shaft; a first cam follower means engageable with one of said cams and connected with the valve element of said detachable valve structure, and a second cam follower means engageable with the opposed cam and including a stem extending through the valve element of the detachable valve structure for engagement with the valve element of the fixed valve structure, said handle being operable through said opposed cams and cam followers to open said valve elements simultaneously, thereby to permit flow between said pipe line and said fueling hose.

13. An aviation fueling and defueling hydrant valve, comprising: a valve body structure having ports at its upper and lower ends, a downwardly directed upper valve seat defining the upper end port of said valve body structure, and an upwardly directed lower valve seat defining the lower end port of said valve body structure; a valve element reciprocable in said valve body between an upper closed position engaging said upper valve seat and a lower open position; a skirt depending from said valve element; a float valve element reciprocable in said valve body structure between a lower closed position engaging said lower valve seat and an upper open position partially shielded within said skirt; and means for opening said valve element for flow of fluids through said valve body structure in either direction, said skirt shielding said float valve against the force of a liquid flowing through said valve body structure, whereby the buoyancy of said float valve maintains said float valve open during the presence of a liquid flowing downwardly through said valve body structure, said float valve being movable to its closed position to prevent downward flow of gas on depletion of said liquid in said valve body structure, said float valve tending to open in response to upward flow of fluids through said valve body structure.

14. An aviation fueling and defueling hydrant valve, comprising: a valve body structure having ports at its upper and lower ends, a downwardly directed upper valve seat defining the upper end port of said valve body structure, and an upwardly directed lower valve seat defining the lower end port of said valve body structure; a valve element reciprocable in said valve body between an upper closed position engaging said upper valve seat and lower open position; a skirt depending from said valve element; a float valve element reciprocable in said valve body structure between a lower closed position engaging said lower valve seat and an upper open position partially shielded within said skirt; means for opening said valve element for flow of fluids through said valve body structure in either direction, said skirt shielding said float valve against the force of a liquid flowing through said valve body structure, whereby the buoyancy of said float valve maintains said float valve open during the presence of a liquid flowing downwardly through said valve body structure, said float valve being movable to its closed position to prevent downward flow of gas on depletion of said liquid in said valve body structure, said float valve tending to open in response to upward flow of fluids through said valve body structure; and a valve controlled by-pass around said float valve and lower valve seat to permit the equalization of pressure across said float valve.

15. An aviation fueling and defueling hydrant valve, comprising: a valve body structure having ports at its upper and lower ends, a downwardly directed upper valve seat defining the upper end port of said valve body structure, and an upwardly directed lower valve seat defining the lower end port of said valve body structure; a valve element reciprocable in said valve body between an upper closed position engaging said upper valve seat and a lower open position; a skirt depending from said valve element; a float valve element reciprocable in said valve body structure between a lower closed position engaging said lower valve seat and an upper open position partially shielded within said skirt; means for opening said valve element for flow of fluids through said body structure in either direction; and a deflecting channel formed at the lower end of said valve body structure surrounding said lower valve seat for deflecting downwardly flowing liquid against the under side of said float valve; said skirt and said deflected liquid and the buoyancy of said float valve cooperating to hold said float valve open during downward flow of liquid through said valve body structure, said float valve tending to close on depletion of liquid from said valve body structure, said float valve tending to open in response to upward flow of fluids through said valve structure.

References Cited in the file of this patent

UNITED STATES PATENTS

| | | |
|---|---|---|
| 1,309,230 | Wells | July 8, 1919 |
| 2,548,528 | Hansen | Apr. 10, 1951 |
| 2,565,872 | Melsheimer | Aug. 28, 1951 |
| 2,629,395 | Krone | Feb. 24, 1953 |

FOREIGN PATENTS

| | | |
|---|---|---|
| 101,485 | Australia | June 29, 1937 |
| 715,383 | Great Britain | Sept. 15, 1954 |
| 858,617 | Germany | Dec. 8, 1952 |